(12) United States Patent
Gopalarathnam et al.

(10) Patent No.: US 10,142,177 B2
(45) Date of Patent: Nov. 27, 2018

(54) MECHANISMS TO IDENTIFY MISMATCHES IN LAYER 3 CONFIGURATION IN A NETWORK

(71) Applicant: DELL PRODUCTS L.P., Round Rock, TX (US)

(72) Inventors: Sudharsan Dhamal Gopalarathnam, Chennai (IN); Premnath Sundarababu, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 547 days.

(21) Appl. No.: 14/710,903

(22) Filed: May 13, 2015

(65) Prior Publication Data
US 2016/0337187 A1    Nov. 17, 2016

(51) Int. Cl.
    *G06F 15/177*   (2006.01)
    *H04L 12/24*    (2006.01)
    *H04L 12/931*   (2013.01)

(52) U.S. Cl.
    CPC ...... *H04L 41/0816* (2013.01); *H04L 41/0873* (2013.01); *H04L 49/351* (2013.01)

(58) Field of Classification Search
    CPC ............. H04L 41/0816; H04L 41/0873; H04L 49/351
    See application file for complete search history.

(56) References Cited

U.S. PATENT DOCUMENTS

| | | | | |
|---|---|---|---|---|
| 5,926,463 A * | 7/1999 | Ahearn | ................. | H04L 41/024 370/254 |
| 6,377,987 B1 * | 4/2002 | Kracht | ................. | H04L 41/0213 370/254 |
| 6,456,597 B1 * | 9/2002 | Bare | ................. | H04L 29/12009 370/252 |
| 9,838,219 B2 * | 12/2017 | PalChaudhuri | ..... | H04L 12/4641 |
| 2002/0184374 A1 * | 12/2002 | Morikawa | ................. | G10L 15/30 709/228 |
| 2008/0095160 A1 * | 4/2008 | Yadav | ................. | H04L 12/1886 370/390 |
| 2010/0287266 A1 * | 11/2010 | Asati | ................. | H04L 12/4641 709/222 |
| 2011/0238805 A1 * | 9/2011 | Signori | ................. | H04L 41/0816 709/223 |
| 2013/0124721 A1 * | 5/2013 | Prasadam | ................. | H04L 41/12 709/224 |

(Continued)

*Primary Examiner* — June Y Sison
*Assistant Examiner* — Dixon F Dabipi
(74) *Attorney, Agent, or Firm* — North Weber & Baugh LLP (57) ABSTRACT

Embodiments of the present invention include systems and methods for identifying an error in a Layer 3 network configuration. The system for identifying an error includes ports for receiving information of network Layer 3 configurations from devices that are communicatively coupled to the system through a network, where each of the network configurations includes a parameter. Embodiments of the system also include compiling the information of network configurations into one or more tables, wherein the one or more tables include a list of values for the network configuration parameter(s) and numbers of devices or interfaces that match to the list of values. In embodiments, the value that corresponds to the highest number of devices or interfaces in the table may be selected as the correct value.

21 Claims, 5 Drawing Sheets

100

| |
|---|
| IPv4 address 102 |
| IPv4 subnet mask 104 |
| Secondary IPv4 address 106 |
| Secondary IPv4 subnet mask 108 |
| IPv6 address 1 110-1 |
| IPv6 subnet mask 1 112-1 |
| . . . |
| IPv6 address n 110-n |
| IPv6 subnet mask n 112-n |
| Layer 2 VLAN 114 |

(56) References Cited

U.S. PATENT DOCUMENTS

| | | | |
|---|---|---|---|
| 2014/0244815 A1* | 8/2014 | Bhardwaj | H04L 45/745 709/223 |
| 2015/0319042 A1* | 11/2015 | PalChaudhuri | H04L 41/0873 370/395.53 |
| 2016/0277469 A1* | 9/2016 | Gilson | H04L 65/4069 |

* cited by examiner

100

| IPv4 address 102 |
| IPv4 subnet mask 104 |
| Secondary IPv4 address 106 |
| Secondary IPv4 subnet mask 108 |
| IPv6 address 1  110-1 |
| IPv6 subnet mask 1  112-1 |
| . . . |
| IPv6 address n  110-n |
| IPv6 subnet mask n  112-n |
| Layer 2 VLAN 114 |

| Interface (sw1-sw2) 302 | Local IP configuration 304 | Remote IP configuration 306 |
|---|---|---|
| 0/0 – 0/0 | 2.2.2.2/16 | 1.1.1.1/16 |

| VLAN 502 | IP configuration 504 | Matches 506 |
|---|---|---|
| 10* | 1.1.0.0/16 | 2 |
| 10* | 2.1.0.0/16 | 1 |

| VLAN 602 | IP configuration 604 | Device 606 |
|---|---|---|
| 10* | 1.1.1.1/16 | Router-1 |
| 10* | 2.2.1.2/16 | Local |
| 10* | 1.1.1.3/16 | Router-3 |

MECHANISMS TO IDENTIFY MISMATCHES IN LAYER 3 CONFIGURATION IN A NETWORK

TECHNICAL FIELD

The present invention relates to distributing data in a network communication, more particularly, to systems and methods for identifying mismatches in Layer 3 configurations of interfaces in a network to prevent loss of data during transmission.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In general, a Layer 3 configuration is assigned to each port of a node, such as router or switch, in a network. To transmit data between two nodes that are directly connected to each other and/or coupled to each other in a virtual local area network (VLAN), the corresponding ports of the two nodes need to have a matched Layer 3 configuration. If there is a mismatch, the data to be communicated between the two nodes may not be transmitted through the ports, resulting in loss of data in the network.

As such, there is a need for systems and methods that can identify the mismatch in Layer 3 configurations of ports, to thereby reduce the loss of data during data transmission through network systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components/nodes/switches within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; (3) that certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

In general, Internet Protocol (IP) address has two components, the network address and the host address. A subnet mask separates the IP address into the network and host addresses. Subnetting further divides the host part of an IP address into a subnet and host address if additional subnetwork is needed. Hereinafter, the term subnet refers to a portion of the IP address that designates the subnet where a network device belongs.

In general, a virtual local area network (VLAN) refers to a group of network devices on one or more LANs that are configured to communicate as if they were attached to the same wire, when in fact they are located on a number of different LAN segments. In embodiments, a VLAN may be assigned a unique primary IP address if it is designated for routing purpose. Also, in embodiments, a port may be a part of one or more VLANs, i.e., more than one VLANs may be assigned to same physical port. As such a node may have one or more ports, and each port may be communicatively coupled to a set of VLANs. (The term "a set of" refers to one, a portion, or all of the objects that immediately follow the term.) Similarly a port can be assigned an IP Addresses directly when it's used in pure routing mode.

Figure 1:
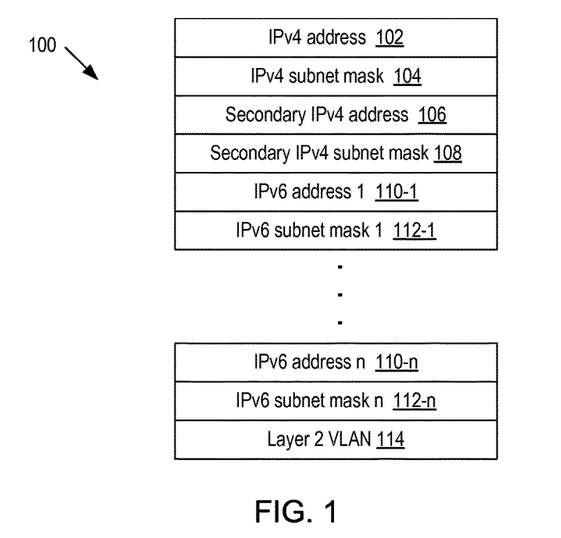
FIG. 1 ("FIG.") shows a schematic diagram of a Layer 3 configuration file applied to a router in a network according to embodiments of the present invention.

FIG. 1 shows a schematic diagram of a Layer 3 configuration file 100 applied to a router in a network according to embodiments of the present invention. (Hereinafter, a router may be replaced by a suitable Layer 3 network device.) As depicted, in embodiments, the configuration file 100 may include IPv4 address 102 and IPv4 subnet mask 104 of an interface in the router, and optionally, secondary IPv4 address 106 and secondary IPv4 subnet mask 108 of a physical interface or VLAN in the router. The configuration file 100 may also include multiple pairs of IPv6 address 110 and IPv6 subnet mask 112 for interfaces in the router. In embodiments, the router is coupled to one or more nodes (such as switches and/or routers) in a virtual local area network (VLAN) and the configuration file 100 may include information of the VLAN 114. Also, in embodiments, as discussed above, a router may have multiple interfaces that each may belong to one or more VLANs.

It is noted that the configuration file 100 may be applied to other suitable network communication device. Also, for the purpose of illustration, only the IP address/subnet mask is shown as Layer 3 configuration data in the configuration file 100. However, it should be apparent to those of ordinary skill in the art that the configuration file 100 may contain other suitable Layer 3 configuration data.

After the configuration file 100 is applied, the router may exchange the Layer 3 configuration information to one or more peers in the same network, such as subnet or VLAN. In embodiments, a router may exchange the Layer 3 configuration information using a protocol, such as link-layer-discovery-protocol (LLDP) time-length-value (TLV). Hereinafter, the term Layer 3 Check (L3C) TLV refers to a LLDP TLV protocol that includes the Layer 3 configuration information. Also, the term peer refers to a network device, such as router or switch that is coupled to the router for communication in the network.

For the purpose of illustration, it is assumed that the peers exchange the Layer 3 configuration in the LLDP TLV format. However, it should be apparent to those of ordinary skill in the art that other suitable type of protocol may be used in place of LLDP TLV.

Figure 2:
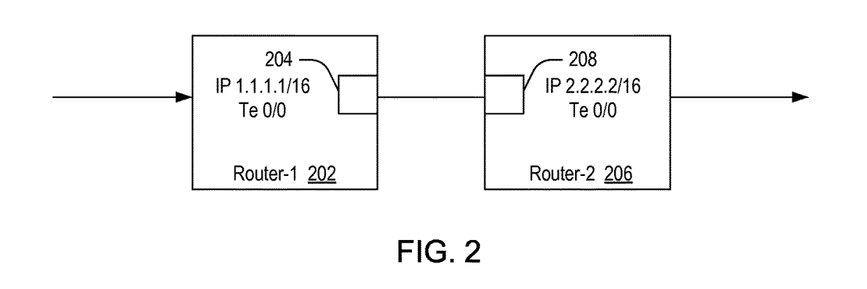
FIG. 2 shows a schematic diagram of two routers directly connected to each other for communication according to embodiments of the present invention.

FIG. 2 shows a schematic diagram of two routers directly coupled to each other in a network for communication according to embodiments of the present invention. As depicted, a port 0/0 204 of the router-1 202 is directly coupled to a port 0/0 208 of the router-2 206, forming a back-to-back interface. Hereinafter, the terms port and interface are used interchangeably. For brevity, the other ports of the routers 202 and 206 are not shown in FIG. 2. The ports 202 and 206 may operate in the pure routing mode and an IP address may be assigned to each port. In embodiments, to exchange the data between the routers 202 and 206, the IP subnet of the port 204 matches the IP subnet of the port 208, i.e., both ports have the same IP subnet.

After the configuration file 100 is applied to the router-1 202, the router-1 202 may send L3C TLV to the router-2 206 (or vice versa). Then, the router-2 206 may compare the IP subnet of the port 208 to the IP subnet of the port 204. In embodiments, if there is a mismatch, the router-2 206 may notify a user of the mismatch information. For the purpose of illustration, it is assumed that the IP address of the port 204 is 1.1.1.1/16, while the IP address of the port 208 is 2.2.2.2/16. In this example, there is a mismatch between the IP subnets of the two ports/interfaces.

Figure 3:
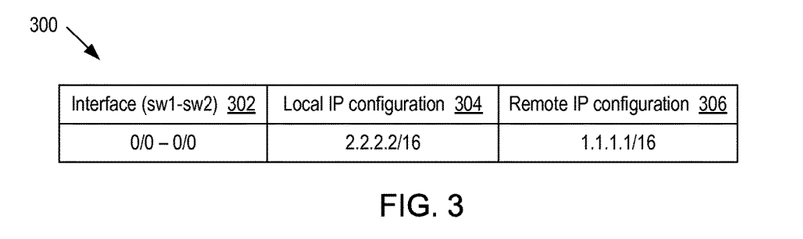
FIG. 3 shows a schematic diagram of mismatch information according to embodiments of the present invention.

FIG. 3 shows a schematic diagram of mismatch information 300 to be display to a user according to embodiments of the present invention. As depicted, the mismatch information, which may be sent by the router-2 206 to the user, may include: the interface information 302, which includes the identification of ports 204 and 208; the local IP configuration 304, which represents the IP address/subnet of the port 208 in the reporting router 206; and a remote IP configuration 306, which represents the IP address/subnet of the port 204 in the router 202 coupled to the reporting router 206.

In embodiments, the router-2 206 may set the port 208 to an error state. Likewise, the router-1 202 may set the port 204 to an error state. In embodiments, the mismatch information 300 may include other suitable data and be displayed to the user in other suitable format. For instance, a log or trap may be generated based on which the user needs to take action for rectification. When the user rectifies the mismatch error, the port 208 may be moved from the error state to the normal state.

In embodiments, a router in a network may have multiple interfaces/ports that are connected to peers and send its L3C TLV having IP subnet information on a set of its connected interfaces to the peers. In embodiments, a router may be directly coupled to a layer 2 (L2) switch, i.e., the next hop in the network is an L2 switch. In such a case, the L2 switch may store the IP subnet assigned to the network into its database, mapping the IP subnet with the port number that it received the L3C TLV through. Also, the L2 switch may forward the L3C TLV through all of its interfaces that are tagged to the network belonging to the same VLAN except the interface that the L2 switch received the L3C TLV through.

In embodiments, an L2 switch may be connected to only two routers in a network and the two L3C TLVs received from the two routers may show a mismatch in the IP subnets. In such a case, the L2 switch may forward the L3C TLV of one router to the other router. Since the L2 switch may not be able to determine which one of the two IP subnets is the correct IP subnet, an error action may be triggered in each router and at least one of the routers may send mismatch information to the user.

Figure 4:
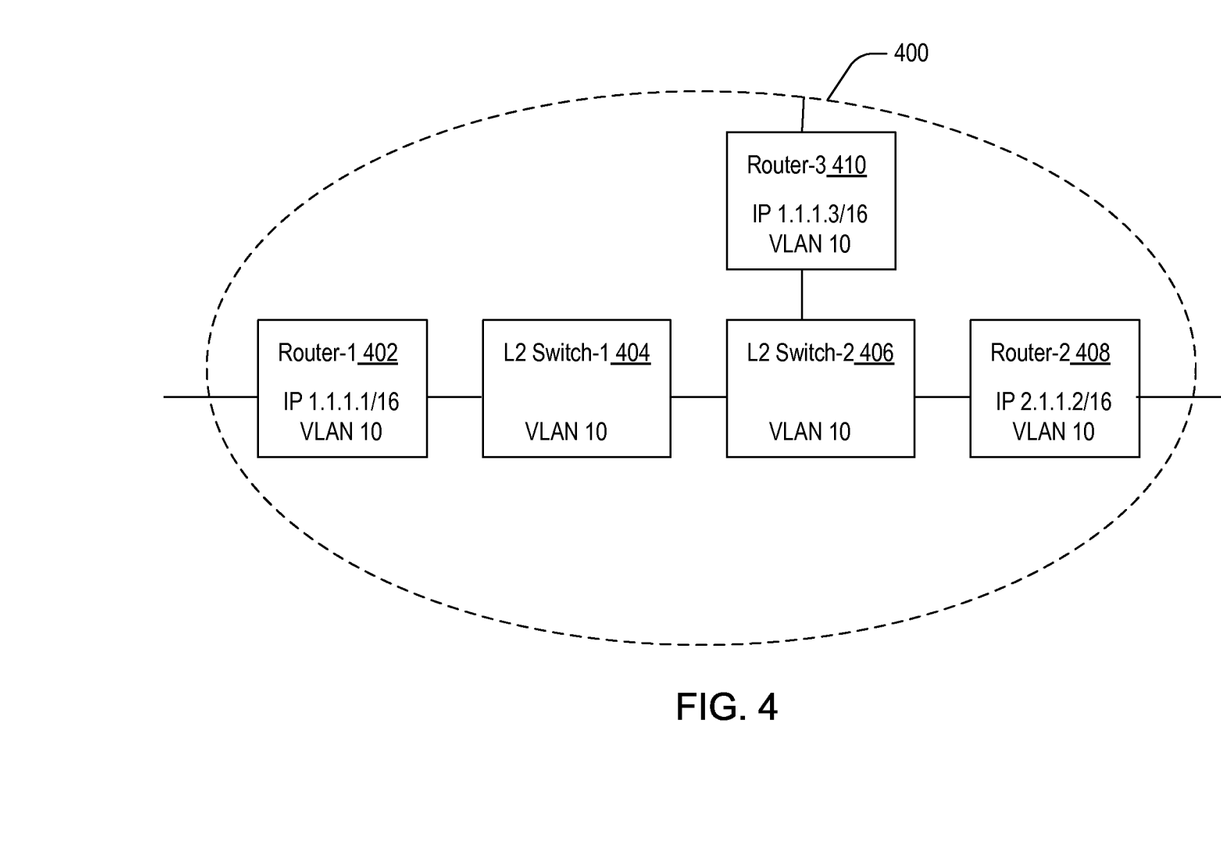
FIG. 4 shows a schematic diagram of a network according to embodiments of the present invention.

In embodiments, an L2 switch may be connected to multiple routers and/or switches in a network and the L3C TLVs received from the peers may show a mismatch in the IP subnets. FIG. 4 shows a schematic diagram of a network 400 according to embodiments of the present invention. In embodiments, the network 400 may be any suitable type of communication network, such as virtual local area network (VLAN). Hereinafter, for the purpose of illustration, the network 400 is assumed to be a VLAN and the ID number assigned to the VLAN is "10."

As depicted, there may be one or more L2 switches 404 and 406, coupled to the routers 402, 408, and 410. It is noted that other suitable number of routers and L2 switches may be included in the network 400. After the user sets the Layer 3 configuration to the router-1 402, the router-1 402 may send its L3C TLV to the L2 Switch-1 404. Then, in embodiments, as discussed above, the L2 Switch-1 404 may store the information of the IP subnet that is assigned to the network 400 and mapped to the corresponding port of the router-1 402. Also, the L2 Switch-1 404 may forward the L3C TLV through all of its interfaces that are tagged to the network 400 except the interface that the L2 switch received the L3C TLV through. For instance, the L2 switch-1 404 may forward the L3C TLV to L2 switch-2 406. Then, subsequently, L2 switch-2 206 may forward the L3C TLV to routers 408 and 410. Likewise, the router-2 408 (or router-3 410) may send an L3C TLV to the L2 switch-2 406, and the L2 switch-2 406 may store and forward it to the L2 switch-1 404 and the router-3 410 (or router-2 408).

Figure 5:
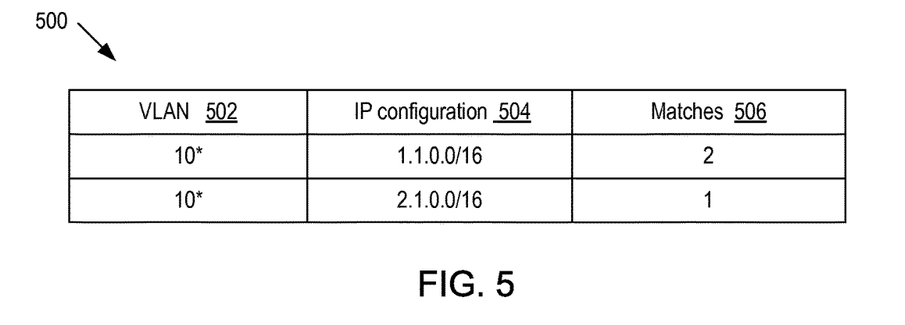
FIG. 5 shows a schematic diagram of an IP subnet table stored in a router according to embodiments of the present invention.

In embodiments, a router in a network may store information of IP subnets that are assigned to the network and configured in the peers of the network. FIG. 5 shows a schematic diagram of an IP subnet table (or, equivalently, interface configuration table) 500 stored in a router, say router-2 408, according to embodiments of the present invention. As depicted, the table 500 includes a list of VLANs 502, IP configurations 504 assigned to each VLAN, and matches 506 that show the number of IP subnet counts for each VLAN.

When the router receives L3C TLV information from a peer, the router may look up the table 500 to check if there is a corresponding VLAN and IP configuration in the table 500. If so, the router may increase the corresponding match 506 by one. If not, the router may make a new row, populate the row with the received L3C TLV information, and mark the corresponding VLAN 502 (e.g., with "*") to indicate that a mismatch is found for the VLAN. For instance, in FIG. 5, VLAN 10 is marked with "*" since a mismatch in the IP configurations is found. (As discussed above, only one IP address is assigned to a VLAN. The IP addresses assigned to a particular VLAN should belong to the same subnet across the neighbors. Thus, if more than one IP subnet association to VLAN 10 is identified across different neighboring routers, VLAN 10 is marked to indicate that there is a mismatch in IP configuration, as shown in FIG. 5.)

In embodiments, when there is a mismatch, the router may select the IP configuration corresponding to the most matches as the correct IP subnet assigned to VLAN 10. For instance, as depicted in table 500, VLAN 10 is associated with IP subnet 1.1.0.0/16 twice and 2.2.0.0/16 once across the neighboring routers. As such, it may be determined that the correct IP subnet for VLAN 10 is 1.1.0.0/16 and the router-2 408, more specifically a port of the router-2 408, is misconfigured with an incorrect IP subnet.

When two or more entries in the table 500 tie for the most match, it may not be possible to determine the correct IP subnet for the VLAN 10. In such a case, in embodiments, all of the interfaces corresponding to the entries may be set to the error state.

Figure 6:
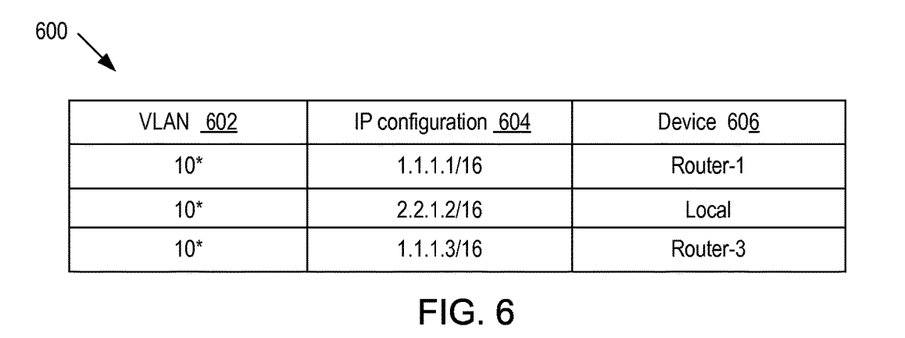
FIG. 6 shows a schematic diagram of IP configuration information stored in a router and having a mismatch according to embodiments of the present invention.

FIG. 6 shows a schematic diagram of IP configuration information 600 stored in a router and having a mismatch according to embodiments of the present invention. As depicted, the information 600 includes a list of devices (i.e., routers) 606 in the network 400, VLANs 602, and IP address/subnets 604 assigned to the VLANs for the devices 606. For instance, the router-2 408, denoted as "local" in the device 606, has a different IP subnet from the other routers. In embodiments, the router-2 408 may display the information 600 to the user or take any other suitable steps to inform the user of the mismatch.

Figure 7:
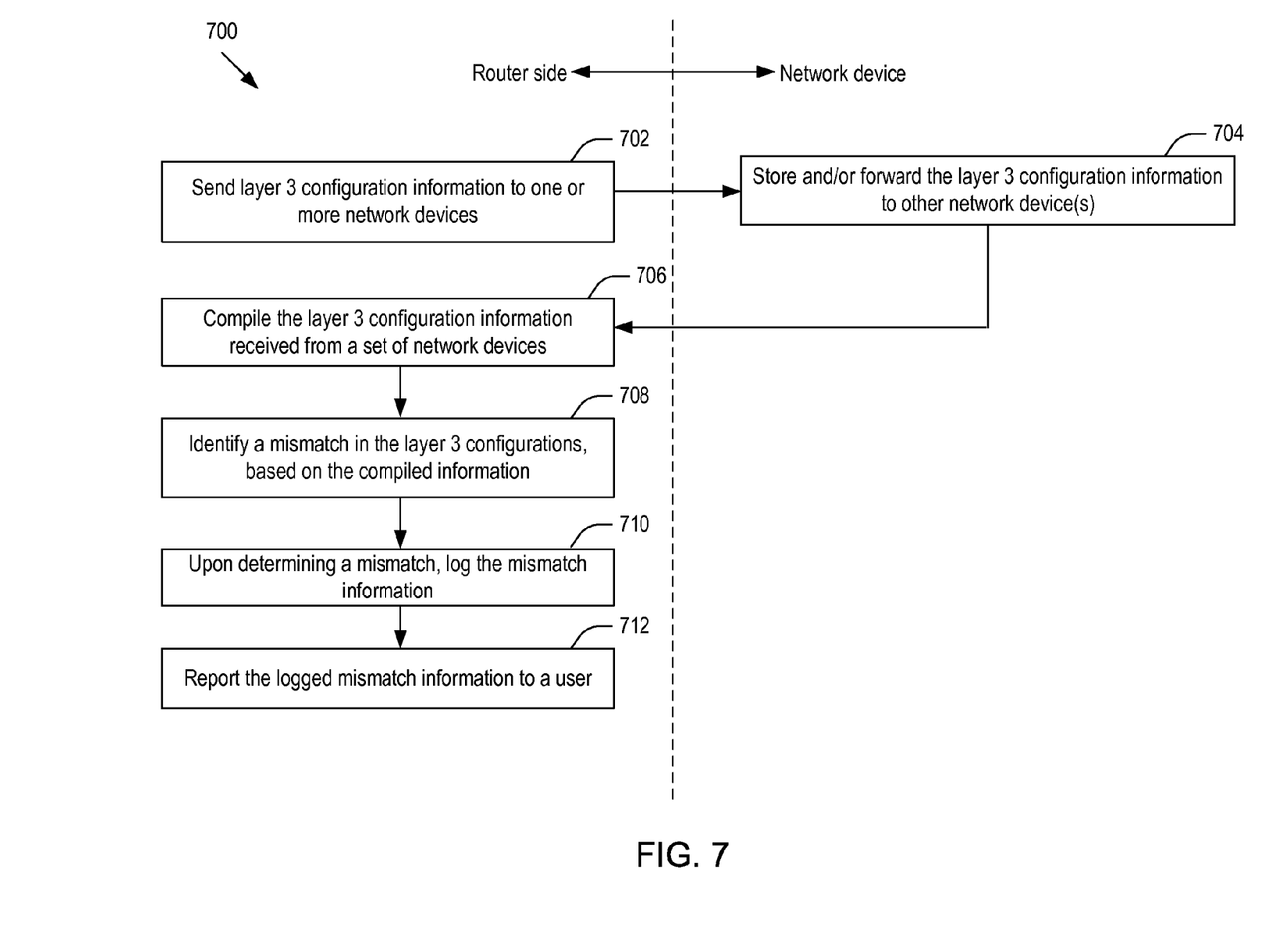
FIG. 7 shows a flowchart of an illustrative process for identifying an error in the network configuration of a device in a network according to embodiments of the present invention.

FIG. 7 shows a flowchart 700 of an illustrative process for identifying an error in the network configuration (such as Layer 3 configuration) of a device (such as router) in a network (such as VLAN) according to embodiments of the present invention. As depicted, steps 702 and 706-712 on the router side may be performed by a router, while steps 704 may be performed by a network device, such as router or L2 switch. The process 700 starts at step 702. At step 702, a router may send the information of its Layer 3 configurations in a preset format, such as L3C TLV format, to one or more network devices communicatively coupled to the router. In embodiments, the Layer 3 configuration may include an interface configuration parameter, such as IP configuration. At step 704, the network device may store and/or forward the information through all of its interfaces that are tagged to the network except the interface through which the Layer 3 configuration is received. In embodiments, the forwarded information may be sent to network devices that are identified as being members of the network.

Next, at step 706, the router may compile the Layer 3 configuration information received from a set of the network devices. In embodiments, each of the network devices may be identified as being a member of the network. In embodiments, an interface configuration table, such as table 500, may be generated, where the table includes a list of the interface configuration parameters, such as IP subnets, and a list of numbers of network devices that respectively match to the list of the interface configuration parameters. Then, based on the compiled information, the router may identify a mismatch in the Layer 3 configurations, such as a mismatch in IP subnets assigned to the network at step 708. In embodiments, to identify the mismatch, the router may assign a vote to each of the interface configuration parameters. Then, router may select the interface configuration parameter that corresponds to the highest number of votes as the correct interface configuration parameter and identify the other interface configuration parameters in the table as incorrect parameters. At step 710, the router may report the mismatched configurations to a user. In embodiments, the router may log the mismatched configurations in a table 600 and send the information of the table 600 to the user so that the user may take proper steps to correct the Layer 3 configuration of the router. The router may also set the port state as error disabled for those ports which are identified with mismatches.

For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
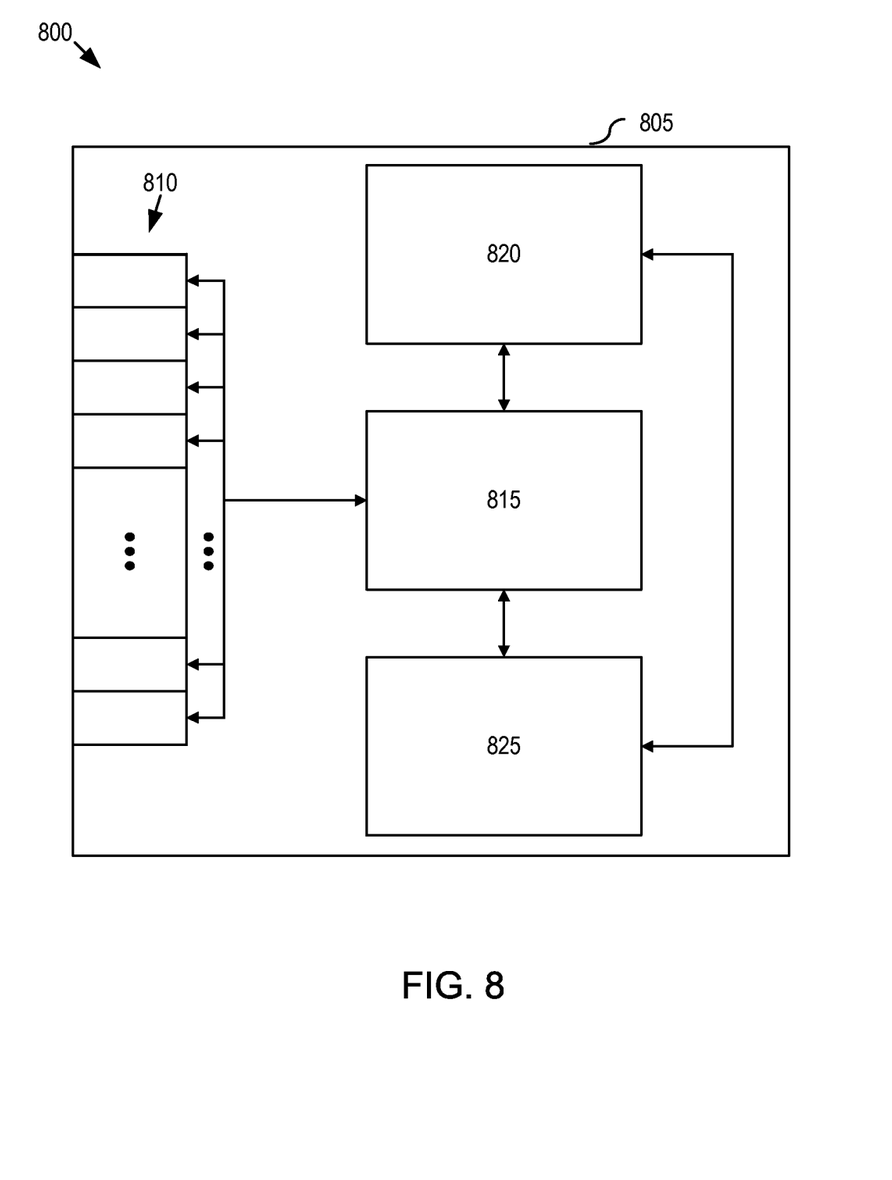
FIG. 8 shows an information handling system according to embodiments of the present invention.

FIG. 8 depicts a simplified block diagram of an information handling system 800 according to embodiments of the present invention. It will be understood that the functionalities shown for device 805 may operate to support various embodiments of an information handling system (or node)—although it shall be understood that an information handling system may be differently configured and include different components. The device 805 may include a plurality of I/O ports 810, a network processing unit (NPU) 815, one or more tables 820, and a central processing unit (CPU) 825. The system includes a power supply (not shown) and may also include other components, which are not shown for sake of simplicity.

In embodiments, the I/O ports 810 may be connected via one or more cables to one or more other network devices or clients. The network processing unit (NPU) 815 may use information included in the network data received at the device 805, as well as information stored in the tables 820, to identify a next hop for the network data, among other possible activities. In embodiments, a switching fabric then schedules the network data for propagation through the device to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system for identifying an error in a network interface configuration, comprising:
   a plurality of ports, at least one or more of the plurality of ports being communicatively coupled to one or more network devices;
   one or more processors that are communicatively coupled to the plurality of ports; and
   a memory that is communicatively coupled to the one or more processors and stores one or more sequences of instructions, in which execution of the one or more sequences of instructions by at least one of the one or more processors causes steps to be performed comprising:
      receiving a Layer 3 configuration for one or more ports of a network device from a set of network devices, wherein each of the one or more ports is identified as being a member of a communication network;
      generating a Layer 3 configuration table that comprises the Layer 3 configurations and, for each unique Layer 3 configuration, a match number representing the number of the network devices from the set of network devices that indicate a match for that Layer 3 configuration;
      responsive to having two or more Layer 3 configurations that are received from two or more network devices for a same communication network, identifying a configuration mismatch between the Layer 3 configurations that include the two or more Layer 3 configurations to determine an incorrect Layer 3 configuration and to determine a port from the plurality of the ports of the information handling system that is communicatively connected to a network device, from the set of network devices, with the incorrect Layer 3 configuration; and
      putting the port from the plurality of the ports of the information handling system that is communicatively connected to the network device with the incorrect Layer 3 configuration into a disabled state.

2. An information handling system as recited in claim 1, wherein the memory further comprises one or more sequences of instructions, in which execution of the one or more sequences of instructions by at least one of the one or more processors causes additional steps to be performed comprising:
   assigning a vote to each of the Layer 3 configurations; and
   using the Layer 3 configuration that corresponds to a highest number of votes as a correct Layer 3 configuration.

3. An information handling system as recited in claim 2, wherein the memory further comprises one or more sequences of instructions, in which execution of the one or more sequences of instructions by at least one of the one or more processors causes additional steps to be performed comprising:
   responsive to having two or more of the Layer 3 configurations tie for the highest number of votes, identifying the two or more of the interface configuration as incorrect Layer 3 configuration parameters.

4. An information handling system as recited in claim 1, wherein the information handling system is a router and wherein the memory further comprises one or more sequences of instructions, in which execution of the one or more sequences of instructions by at least one of the one or more processors causes additional steps to be performed comprising:
   sending a Layer 3 configuration for a port in the router to a set of the network devices.

5. An information handling system as recited in claim 1, wherein the information handling system is a router and wherein the step of receiving a Layer 3 configuration includes:
   receiving a Layer 3 configuration that is forwarded by a switch communicatively coupled to the set of network devices.

6. An information handling system as recited in claim 1, wherein the memory further comprises one or more sequences of instructions, in which execution of the one or more sequences of instructions by at least one of the one or more processors causes additional steps to be performed comprising:
   reporting an error message to a user.

7. An information handling system as recited in claim 1, wherein the communication network is a virtual local area network (VLAN).

8. An information handling system as recited in claim 1, wherein each of the one or more ports is a pure routing port.

9. A computer-implemented method for identifying an error in a network interface configuration, comprising:
   receiving, at an information handling system, a Layer 3 configuration for one or more interfaces of at least one a network device from a set of network devices, wherein each of the one or more interfaces is identified as being a member of a communication network;
   generating a Layer 3 configuration table that comprises the Layer 3 configurations and, for each unique Layer 3 configuration, a match number representing the number of the network devices that indicate a match for that Layer 3 configuration;
   responsive to having two or more Layer 3 configurations for a same communication network, identifying a configuration mismatch between the Layer 3 configurations that include the two or more Layer 3 configurations to determine an incorrect Layer 3 configuration and to determine an interface of the information handling system that is communicatively connected to a network device, from the set of network devices, with the incorrect Layer 3 configuration; and
   putting the interface of the information handling system that is communicatively connected to the network device with the incorrect Layer 3 configuration into a disabled state.

10. A computer-implemented method as recited in claim 9, further comprising:
    assigning a vote to each of the Layer 3 configurations, wherein the step of identifying a configuration mismatch comprises using the Layer 3 configuration that corresponds to a highest number of votes as a correct Layer 3 configuration for the one or more interfaces.

11. A computer-implemented method as recited in claim 9, wherein the step of identifying a configuration mismatch further comprises:
    assigning a vote to each of the Layer 3 configurations; and
    responsive to having two or more of the Layer 3 configurations that tie for a highest number of votes, identifying the two or more of the Layer 3 configurations as incorrect Layer 3 configurations.

12. A computer-implemented method as recited in claim 9, further comprising:
    sending a Layer 3 configuration to a set of the network devices.

13. A computer-implemented method as recited in claim 9, wherein the step of receiving a Layer 3 configuration includes:
    receiving a Layer 3 configuration that is forwarded by a switch communicatively coupled to the set of network devices.

14. A computer-implemented method as recited in claim 9, further comprising:
    reporting an error message to a user.

15. A computer-implemented method as recited in claim 9, wherein the communication network is a virtual local area network (VLAN).

16. A computer-implemented method as recited in claim 9, wherein each of the one or more interfaces is a pure routing port.

17. A computer-implemented method for identifying a mismatch in a network interface configuration, comprising:
    receiving, at an information handling system, a Layer 3 configuration for a set of ports of at least one network device from a set of network devices, wherein each of the set of ports is identified as being a member of a virtual local area network (VLAN);
    generating a Layer 3 configuration table that comprises the Layer 3 configurations and, for each unique Layer 3 configuration, a match number representing the number of the network devices that indicate a match for that Layer 3 configuration;
    identifying a mismatch in the Layer 3 configurations responsive to determining that two or more Layer 3 configurations are received from two or more network devices and assigned to a same VLAN;
    based on the identified mismatch, determining an incorrect Layer 3 configuration and a port of the information handling system that is communicatively connected to a network device, from the set of network devices, with the incorrect Layer 3 configuration; and
    putting the port of the information handling system that is communicatively connected to the network device with the incorrect Layer 3 configuration into a disabled state.

18. A computer-implemented method as recited in claim 17 further comprising:
    assigning a vote to each of the Layer 3 configurations; and
    identifying the Layer 3 configuration that corresponds to a highest number of votes as a correct Layer 3 configuration.

19. An information handling system as recited in claim 2, wherein the vote is based upon the match number.

20. A computer-implemented method as recited in claim 11, wherein the vote is based upon the match number.

21. A computer-implemented method as recited in claim 18, wherein the vote is based upon the match number.

* * * * *